March 31, 1959 F. J. BELSKY ET AL 2,879,861
FLOW CONTROL UNIT
Filed Nov. 16, 1956 3 Sheets-Sheet 1

INVENTORS
FRED J. BELSKY
ALBERT A. BLANCK
BY

*Kenyon & Kenyon*
ATTORNEYS

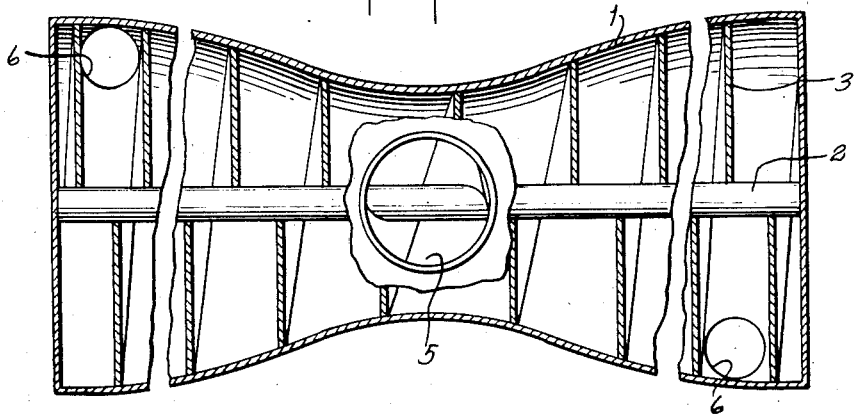
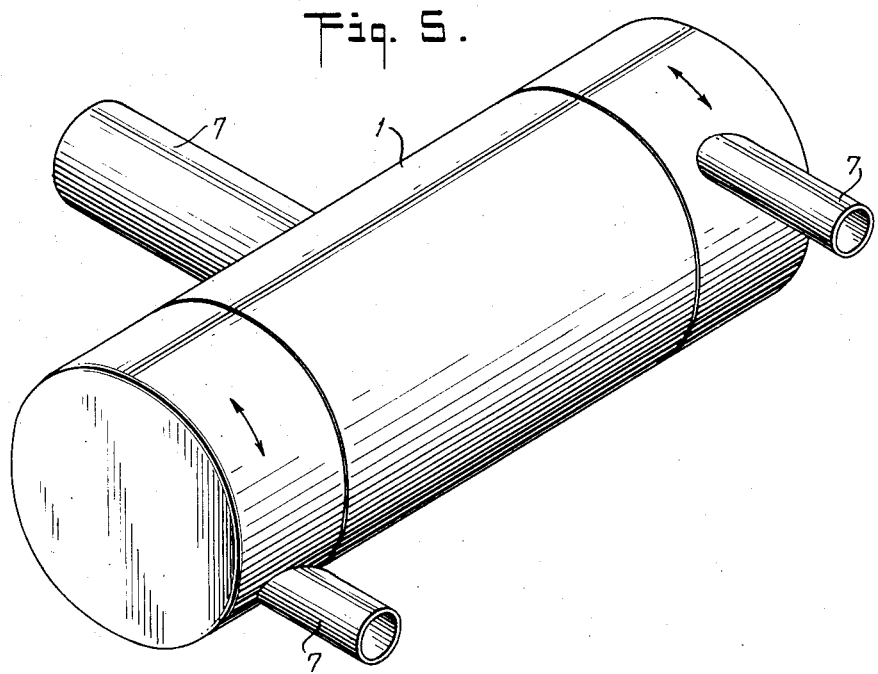

March 31, 1959  F. J. BELSKY ET AL  2,879,861
FLOW CONTROL UNIT

Filed Nov. 16, 1956  3 Sheets-Sheet 3

INVENTORS
FRED J. BELSKY
ALBERT A. BLANCK
BY
*Kenyon & Kenyon*
ATTORNEYS

2,879,861

FLOW CONTROL UNIT

Fred J. Belsky, Coytesville, N.J., and Albert A. Blanck, Elmont, N.Y.

Application November 16, 1956, Serial No. 622,644

10 Claims. (Cl. 181—60)

The present invention relates to a flow control unit adapted to control the flow or passage of various gaseous or liquid media and to attenuate acoustical energy associated with such flow or emanating from sound-generating equipment providing it is or can be transmitted through a conduit.

More particularly, the invention is concerned with a flow control unit adapted for use as an acoustical muffler to muffle the exhaust from internal combustion engines, gas turbine engines, vacuum cleaners, aircraft and engine test cells, air conditioners, ventilators, musical instruments of the wind type, and the like without restricting the flow of the media with which the acoustical energy is associated. The flow control unit of the present invention may be utilized as a muffler regardless of whether or not the acoustical energy is accompanied by a fluid stream, or exists in such a stream, although the device is particularly adapted to handle flowing fluids such as the exhaust gases from an internal combustion engine or the like.

The flow control unit of the present invention is also adapted for use as a thrust director to provide thrust directional control for aircraft powered by turbo-jet engines. In this application the device provides thrust directional control about all three axes of the aircraft—lateral axis for pitch control, longitudinal axis for lateral control and vertical axis for directional control.

The device of the present invention is also adapted for use as a heat exchanger and as a flow dampener to dampen the pulsating flow of liquid or gaseous media.

In view of the foregoing it is one object of the present invention to provide a flow control unit which is simple and inexpensive to manufacture and which at the same time, provides an unusually high efficiency in relation to its physical size.

More specifically it is an object of this invention to provide a flow control unit adapted for use as an acoustical muffler having a high degree of sound attenuating ability, and yet which does not cause excessive back pressures which interfere with the flow of the gaseous or liquid media.

Another object of this invention is to provide a flow control unit adapted for use as a heat exchanger having a high over-all efficiency and low pressure drops.

A further object of this invention is to provide a flow control unit adapted to dampen the pulsations in the flow of gaseous or liquid media which may be incorporated in a system, without compromising the system mass flow rate or over-all efficiency.

Yet another object of this invention is to provide a flow control unit adapted for use as a thrust director on aircraft powered by turbo-jet engines.

These and further objects of the invention will be more clearly understood from the following description and from the accompanying drawing in which:

Figure 4 is a view similar to Figure 2, but showing a modified form of the flow control unit;

Figure 5 is a perspective view of the flow control unit of Figure 1 but including an additional feature.

Figure 1:
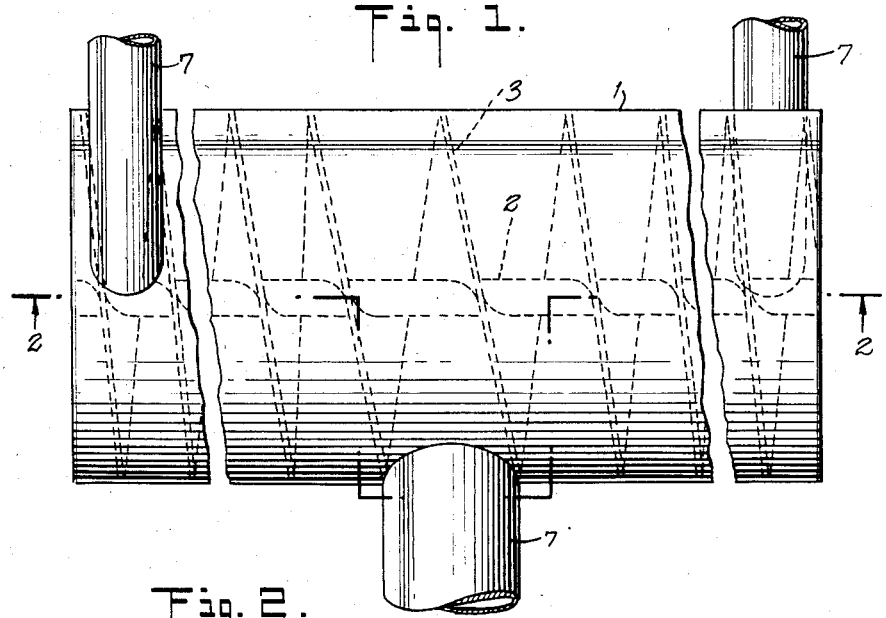
Figure 1 shows one form of the flow control unit, the outer casing being broken away in this view in order to expose the internal construction, the view otherwise being a top elevation.

The flow control unit illustrated in Figure 1 includes a tubular casing 1, a core 2 extending axially through the casing 1, a helical fin 3 which extends radially between the casing 1 and core 2 and winds to form a plurality of convolutions extending axially with respect to the casing and core, and two arc strips 4 disposed radially between the casing 1 and core 2.

The casing 1 has an inlet opening 5 formed therethrough disposed centrally of the casing 1. This inlet has a cross-sectional dimension, extending in the axial direction of the casing 1, which is equal to the pitch of the portion of the fin 3 which is registered with this inlet opening 5, and a cross-sectional dimension, extending in the radial direction of the casing 1, which is greater than the diameter of the core 2.

Figure 3:
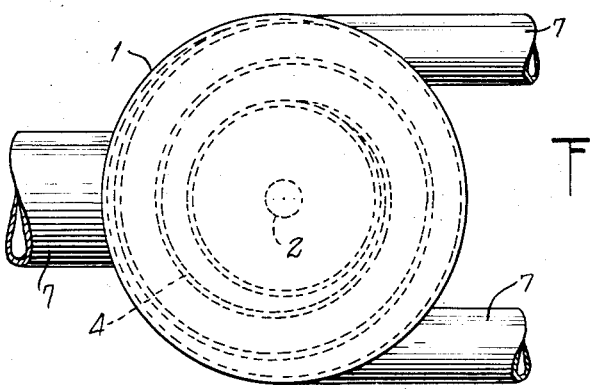
Figure 3 is an end view in elevation of the flow control unit of Figure 1.

The casing 1 also has two outlet openings 6 formed therethrough at the opposite extremities of the casing 1. These outlet openings are positioned between the core 2 and the casing 1. As shown in Figure 3, the inlet opening 5 and the outlet openings 6 may be provided with tubular connectors 7, the inlet connector extending transversely from the casing 1 and the outlet connectors extending tangentially from the casing 1.

As illustrated in the figures the casing 1 is preferably substantially cylindrical in shape and the inlet opening 5 and the outlet opening 6 are preferably substantially circular in shape. It is to be understood, however, that the casing and the inlet and outlet openings may take any desired shape depending upon the space available in which the unit is to be installed. The fin 3 is relatively thin and, if desired, the entire muffler construction may be made from sheet metal.

It is important to note that the helical fin 3 extends radially between the casing 1 and core 2 and winds in the same direction throughout the length of the flow control unit to form a plurality of convolutions extending axially with respect to the casing and core. The helical fin 3 is wound in such a manner that the pitch of the convolutions is greatest for several turns at the center of the flow control unit. As the convolutions of the helical fin 3 wind toward each end of the unit, the pitch of the convolutions is progressively decreased until the pitch of the convolutions for the last several turns of the helical fin is at a minimum for the unit. The pitch of the convolutions of the helical fin 3 located centrally of the flow control unit should be equal to or greater than the cross-sectional dimension of the inlet opening 5 in the axial direction of the casing 1.

The entering liquid or gaseous flow is directed transversely into the casing 1 and in order to minimize the energy loss during the transition from straight flow to helical flow in the casing 1, two arc strips 4 are symmetrically disposed with respect to the inlet opening 5. The width of these arc strips in the axial direction of the casing 1 is equal to the pitch of the convolutions of the helical fin 3. These arc strips are located radially between the casing 1 and core 2. Each arc strip commences at the point where the inlet opening is formed in the casing 1, the distance between the arc strips at this point, in the radial direction of the casing 1, being equal to or greater than the cross-sectional dimension of the inlet opening 5 extending in the radial direction of the casing 1. These arc strips wind in opposite directions and essentially form a secondary casing extending axially with respect to the casing and core. The radius of the arc strips remain constant as they wind between the convolutions of the helical fin until a point is reached at which the pitch of the convolutions begins to decrease. At this point the width of the arc strips in the axial direction of the casing decreases in direct proportion to the pitch of the convolutions and the arc strip is wound with an increasingly larger radius as the pitch of the convolutions decreases, until it finally merges with the casing 1 at the point where the pitch of the convolutions of the helical fin 3 reaches its minimum valve.

Figure 2:
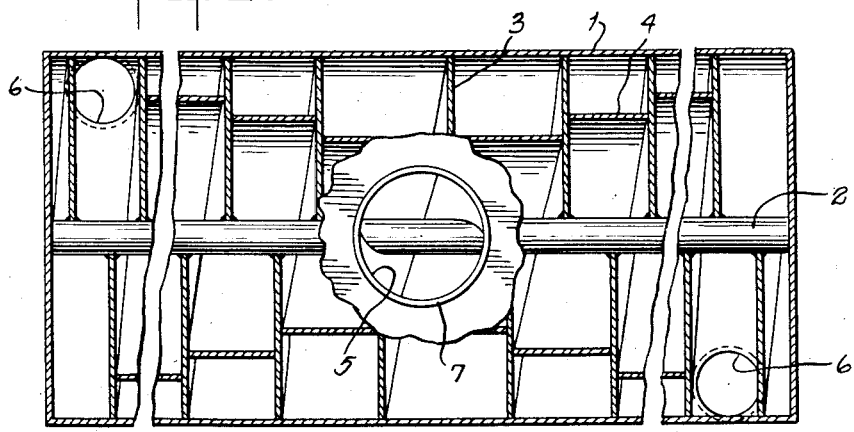
Figure 2 is a cross-section along line 2—2 of Figure 1, the view otherwise being a side elevation.

The flow control unit described above provides two helical passages for the entering liquid or gaseous media. As illustrated in Figure 2 the liquid or gaseous media enters the casing 1 transversely through the centrally located inlet opening 5 and flows in the helical passages formed by the core 2, arc strips 4 and convolutions of the helical fin 3. If the inlet opening 5 is located centrally of the casing 1 the entering media will divide in two, half flowing to the left of the inlet opening and half to the right. The flow will divide uniformly due to the fact that the inlet opening is centrally located in the casing and because the helical fin 3 winds in the same direction throughout the axial length of the casing 1. If the inlet opening is displaced in the radial direction of the casing the flow in the axial direction of the casing will increase in one direction and decrease in the other direction, until a point is reached where the flow is practically all in one direction when the inlet opening is directed tangentially into the casing 1. The liquid or gaseous media is discharged through the outlet openings 6. These outlet openings are located so that the liquid or gaseous media is discharged tangentially from the casing 1. These outlet openings are preferably located at opposite extremities of the casing 1, equidistant from the inlet opening 5.

Practical tests have demonstrated that pressure losses are decreased in the unit as the ratio of the core radius to the height of the helical passage plus the radius of the core is increased. This ratio is designated as the radius ratio. The height of the helical passage is measured in the radial direction of the casing, and is equal to the radial distance between the core 2 and arc strips 4, or, at the extremities of the flow control unit where the arc strips merge with the casing, equal to the radial distance between the core 2 and the casing 1. The pressure losses are also decreased as the ratio between the width of the helical passage and the height of the helical passage is increased. This ratio is designated the aspect ratio. The width is measured in the axial direction of the casing and is equal to the pitch of the convolutions of the fin 3. Similarly, sound attenuation is decreased as the radius ratios and aspect ratios are increased.

In the majority of applications where the flow control unit of the present invention may be utilized, it is desirable to obtain maximum sound attenuation with a minimum pressure loss. This is particularly true in the use of the device of the present invention as an acoustical muffler. For this application it is important that the pressure losses be kept at a minimum in order to eliminate undesirable back pressure, while at the same time maintaining a high level of sound attenuation. The maximum pressure loss occurs when the fluid or gaseous flow is diverted from a straight flow prior to entering the flow control unit to a helical flow within the unit. This pressure loss is minimized in the device of the present invention by providing a large radius ratio and aspect ratio during the interval while the fluid or gaseous media is directed from a straight to a helical flow, thereby substantially overcoming the inertia of the fluid or gaseous flow with a minimum pressure loss. This transition usually occurs within one and one-half turns of the helical fin on either side of the inlet opening. With constant core and casing cross-section dimensions these ratios are increased in the area of the inlet opening by placing the arc strips 4 radially between the core and case, which effectively decreases the height of the helical passages and increases the radius ratio, and by varying the pitch of the convolutions of the helical fin 3, the maximum pitch being in the area of the inlet opening. This increases the width of the helical passages and increases the aspect ratio.

In the area of the inlet opening, therefore, the pressure loss is minimized and undesirable back pressure is virtually eliminated. Once the inertia of the gaseous or liquid stream has been overcome and the transition has been made from straight to helical flow the pitch of the convolutions of the fin is decreased, while the radius of the arc strips is increased, resulting in a smaller radius ratio and aspect ratio. This results in an increased sound attenuation level without any attendant energy losses. When utilized as an acoustical muffler this is the portion of the unit in which the major part of the muffling is performed. Practical tests have indicated that a high level of sound attenuation may be obtained with an aspect ratio of 0.25 and a radius ratio of 0.1, while the energy loss at the area of the inlet opening can be minimized with an aspect ratio of 1.00 and a radius ratio of 0.2.

If desired, the flow control unit of the present invention may be constructed with only one outlet opening. In this event the inlet opening is located at one end of the unit, the flow being introduced either tangentially or transversely, and the outlet opening is located at the other end of the unit. This design, however, creates a region of turbulence in the vicinity of the inlet opening which materially increases the back pressure of the unit. The level of sound attenuation, however, is not affected.

If it is desired to exhaust through only one outlet opening the preferred design is to utilize the configuration of Figure 1 with a cross-over duct from one outlet opening to the connector connected to the other outlet opening. This maintains the desirable features of the unit while still exhausting through only one outlet opening.

The two tangential outlets 6 and the central inlet opening 5 are shown as circular in cross-section. They are shown in this manner since they are linked to a casing 1 that is cylindrical. It is to be understood, however, that these openings may be made in any desirable cross-section.

It is also not material to the invention that the casing 1 have a uniform cross-sectional area throughout its length. As illustrated in Figure 4 the area between the arc strips and the casing may be dispensed with resulting in a tubular casing with its minimum diameter at the center, the diameter progressively increasing until it reaches a maximum at the axial extremities of the casing. With this design it is not necessary to install arc strips since the casing effectively follows the contours of the arc strips of Figure 2. With the design of Figure 4 a varying radius ratio is achieved without resorting to arc strips.

Figure 6:
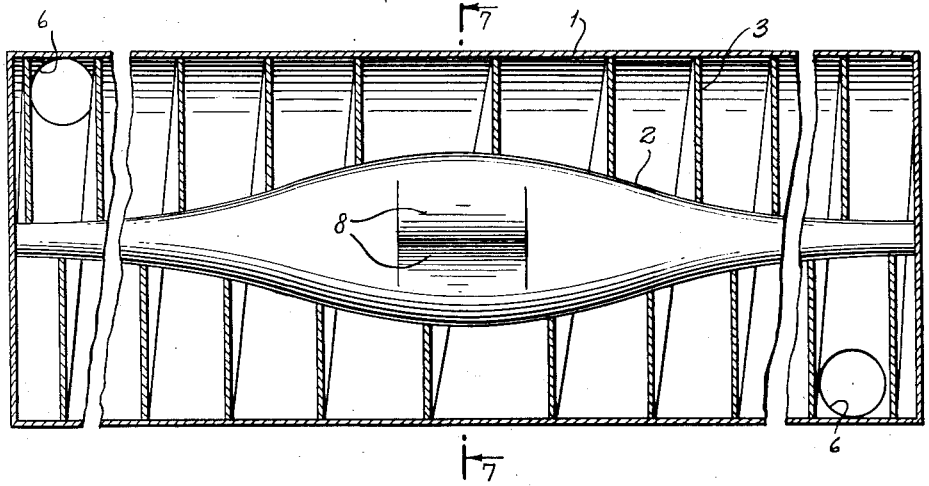
Figure 6 is a view similar to Figure 2, but showing a modified form of the flow control unit.
Figure 7:
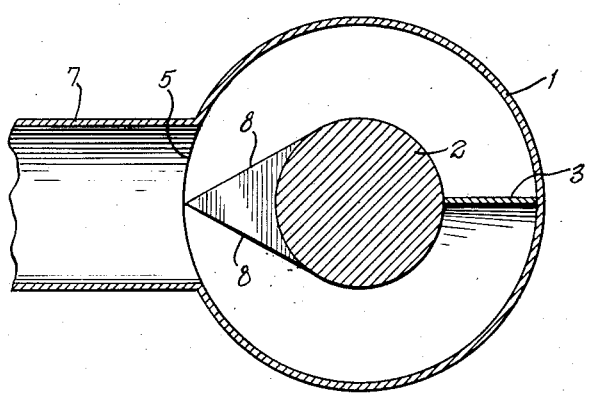
Figure 7 is a cross-section along lines 7—7 of Figure 6, the view otherwise being an end elevation.

If it is desired to maintain the cross-sectional area of the casing 1 uniform throughout its length while dispensing with the necessity of arc strips in order to achieve a varying radius ratio, the construction illustrated in Figures 6 and 7 may be utilized. With this configuration a varying radius ratio is achieved by varying the radius of the core throughout its length. As illustrated in Figures 6 and 7 the diameter of the casing remains constant throughout its length while the core 2 has a maximum diameter at the center, the diameter of the core progressively decreasing until it reaches a minimum at the axial extremities of the casing. In order to prevent the entering media from striking the core before dispersing into the helical passages, thereby creating a turbulence in the area of the inlet opening, two deflecting strips 8 are attached to the core in the area of the inlet opening. These deflecting strips are tangential to the core and taper away from the core toward the inlet opening and converge at the intersection of the casing with the connector 7. As illustrated in Figure 7 the deflecting strips converge in a plane passing through the center of the inlet opening and the center of the core. The width of the deflecting strips is preferably equal to the diameter of the inlet opening. With this construction the entering media is diverted into the helical passages formed by the fins 3, core 2 and casing 1 without appreciable loss of energy.

The flow control unit described above may also be utilized as a heat exchanger. In this application either the hot or cold media is passed through the core 2, while the other media is passed through the helical passages. The flow characteristics of the unit results in a high degree of heat exchange.

The flow control unit of the present invention may also be utilized as a thrust director to provide thrust directional control for aircraft powered by turbo-jet engines. As illustrated in Figure 5 the same unit described above is utilized, the only innovation being that connectors connected to the outlet opening are rotatable in order to control the direction of thrust. The connectors may be rotated by electrical, hydraulic or mechanical means. The connectors by being rotated through 180° can provide thrust either in the forward or reverse direction. Rotating the connectors through 90° so they are positioned in the vertical axis of the aircraft provides thrust in the vertical direction. Incremental rotation of the connectors will supply components of thrust in any desired direction. Restriction or reduction of flow through either one of the connectors, with an increased flow through the other connector, will result in a differential thrust providing a torque.

We claim:

1. A flow control unit comprising a casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, and an inlet connector connected to said inlet opening and extending radially from said casing.

2. A flow control unit comprising a casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing whch is equal to or less than the pitch of the portion of the convolutions of said fin registered with said inlet opening, said fin being substantially helical, and the convolutions of said fin having a variable pitch, the pitch being at its maximum value in the area of the inlet opening and progressively decreasing to its minimum value at the extremity of said casing, and an inlet connector connected to said inlet opening and extending radially from said casing.

3. A flow control unit comprising a tubular casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, a tubular inlet connector connected to said inlet opening and extending radially from said casing, said casing having two outlet openings formed therethrough, said outlet openings being located on either side of the inlet opening at a location offset from said inlet opening axially with respect to said casing, and tubular outlet connectors connected to said outlet openings and extending tangentially from said casing, said casing being substantially cylindrical and said fin being substantially helical, and the convolutions of said fin having a variable pitch, the pitch being at its maximum value in the area of the inlet opening and progressively decreasing to its minimum value at the extremities of said casing.

4. A flow control unit comprising a tubular casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, a tubular inlet connector connected to said inlet opening and extending radially from said casing, said casing having two outlet openings formed therethrough, said outlet openings being located on either side of the inlet opening at a location offset from said inlet opening axially with respect to said casing, and tubular outlet connectors connected to said outlet openings and extending tangentially from said casing, said casing being substantially cylindrical and said fin being substantially helical, and the convolutions of said fin having a variable pitch, the pitch being at its maximum value in the area of the inlet opening and progressively decreasing to its minimum value at the extremities of said casing, and two arc strips, said arc strips being radially disposed between said core and casing and extending in the axial direction of said case between the convolutions of said fin, said arc strips commencing at the inlet opening and winding in opposite directions from said inlet opening between the convolutions of said fin in the axial direction of said case, the radius of said arc strips progressively increasing until they merge with the casing at the point where the pitch of the convolutions has reached its minimum value.

5. A flow control unit comprising a tubular casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, a tubular inlet connector connected to said inlet opening and extending radially from said casing, said casing having two outlet openings formed therethrough, said outlet openings being located on either side of the inlet opening at a location offset from said inlet opening axially with respect to said casing, and tubular outlet connectors connected to said outlet openings and extending tangentially from said casing, said outlet connectors being rotatable about the circumference of the casing in the plane of the outlet connectors, said casing being substantially cylindrical and said fin being substantially helical, and the convolutions of said fin having a variable pitch, the pitch being at its maximum value in the area of the inlet opening and progressively decreasing to its minimum value at the extremities of said casing, and two arc strips, said arc strips being radially disposed between said core and casing and extending in the axial direction of said case between the convolutions of said fin, said arc strips commencing at the inlet opening and winding in opposite directions from said inlet opening between the convolutions of said fin in the axial direction of said case, the radius of said arc strips progressively increasing until they merge with the casing at the point where the pitch of the convolutions has reached its minimum value.

6. A flow control unit comprising a tubular casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, a tubular inlet connector connected to said inlet opening and extending radially from said casing, said casing having two outlet openings formed therethrough, said outlet openings being located on either side of the inlet opening at a location offset from said inlet opening axially with respect to said casing, and tubular outlet connectors connected to said outlet openings and extending tangentially from said casing, said outlet connectors being rotatable about the circumference of the casing in the plane of the outlet connectors, said fin being substantially helical, and the convolutions of said fin having a variable pitch, the pitch being at its maximum value in the area of the inlet opening and progressively decreasing to its minimum value at the extremities of said casing, and said casing being substantially circular in cross-section with a variable radius in the axial direction of the casing, the radius having its minimum value in the area of the inlet opening and progressively increasing until it reaches its maximum value at the point where the pitch of the convolutions reaches its minimum value.

7. A flow control unit comprising a tubular casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, a tubular inlet connector connected to said inlet opening and extending radially from said casing, said casing having two outlet openings formed therethrough, said outlet openings being located on either side of the inlet opening at a location offset from said inlet opening axially with respect to said casing, and tubular outlet connectors connected to said outlet openings and extending tangentially from said casing, said casing being substantially cylindrical and said fin being substantially helical, and the convolutions of said fin having a variable pitch, the pitch being at its maximum value in the area of the inlet opening and progressively decreasing to its minimum value at the extremities of said casing, and said core having a variable radius, the radius of said core being at a maximum in the area of the inlet opening and progressively decreasing to a minimum value at the point where the pitch of the convolutions has reached its minimum value.

8. A flow control unit comprising a tubular casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, a tubular inlet connector connected to said inlet opening and extending radially from said casing, said casing having two outlet openings formed therethrough, said outlet openings being located on either side of the inlet opening at a location offset from said inlet opening axially with respect to said casing, and tubular outlet connectors connected to said outlet openings and extending tangentially from said casing, said casing being substantially cylindrical and said fin being substantially helical, and the convolutions of said fin having a variable pitch, the pitch being at its maximum value in the area of the inlet opening and progressively decreasing to its minimum value at the extremities of said casing, said core having a variable radius, the radius of said core being at a maximum in the area of the inlet opening and progressively decreasing to a minimum value at the point where the pitch of the convolutions has reached its minimum value, and two deflecting strips attached to the outer periphery of said core in the area of said inlet opening and extending in the axial direction of said case between the convolutions of said fin associated with said inlet opening, said deflecting strips extending tangentially from said core and tapering toward one another and merging at the intersection of said tubular inlet connector with said casing.

9. A flow control unit comprising a casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, a tubular inlet connector connected to said inlet opening and extendnig radially from said casing, said casing having two outlet openings formed therethrough, said outlet openings being located on either side of the inlet opening at a location offset from said inlet opening axially with respect to said casing, and tubular outlet connectors connected to said outlet openings and extending tangentially from said casing, said outlet connectors being rotatable about the circumference of the casing in the plane of the outlet connectors, said casing being substantially cylindrical and said fin being substantially helical, and the convolutions of said fin having a variable pitch, the pitch being at its maximum value in the area of the inlet opening and progressively decreasing to its minimum value at the extremities of said casing.

10. A flow control unit comprising a tubular casing, a core extending axially through said casing, a fin extending radially between said casing and core and winding to form a plurality of convolutions extending axially with respect thereto, said casing having an inlet opening disposed substantially at the longitudinal center thereof and extending radially therein, said inlet having a cross-sectional dimension in the axial direction of said casing which is equal to or less than the pitch of the portion of the convolutions of said fin registered with said inlet opening, a tubular inlet connector connected to said inlet opening and extending radially from said casing, said casing having two outlet openings formed therethrough, said outlet openings being located on either side of the inlet opening at a location offset from said inlet opening axially with respect to said casing, and tubular outlet connectors connected to said outlet openings and extending tangentially from said casing, said fin being substantially helical, and the convolutions of said fin having a variable pitch, the pitch being at its maximum value in the area of the inlet opening and progressively decreasing to its minimum value at the extremities of said casing, and said casing being substantially circular in cross-section with a variable radius in the axial direction of the casing, the radius having its minimum value in the area of the inlet opening and progressively increasing until it reaches its maximum value at the point where the pitch of the convolution reaches its minimum value.

References Cited in the file of this patent

UNITED STATES PATENTS

| | | |
|---|---|---|
| 1,191,902 | Leary | July 18, 1916 |
| 1,377,472 | Gibson | May 10, 1921 |
| 1,782,396 | Aaron | Nov. 25, 1930 |
| 2,147,671 | Pratt | Feb. 21, 1939 |

FOREIGN PATENTS

| | | |
|---|---|---|
| 358,970 | Great Britain | Oct. 12, 1931 |
| 387,584 | Great Britain | Feb. 9, 1933 |
| 453,815 | Germany | Dec. 17, 1927 |
| 199,018 | Switzerland | Oct. 17, 1938 |
| 736,635 | Germany | June 23, 1943 |